4 Sheets—Sheet 1.
J. W. HYATT.
Manufacture of Combs from Celluloid, &c.
No. 199,909. Patented Feb. 5, 1878.
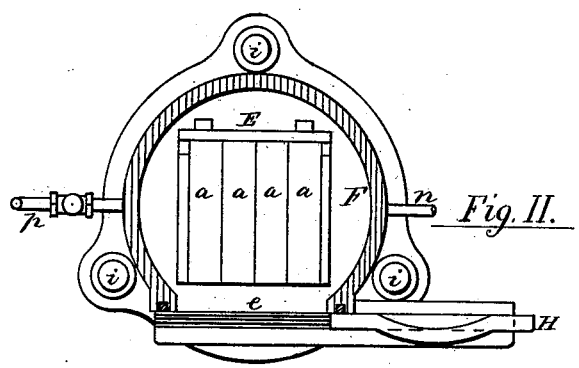
Fig. II.
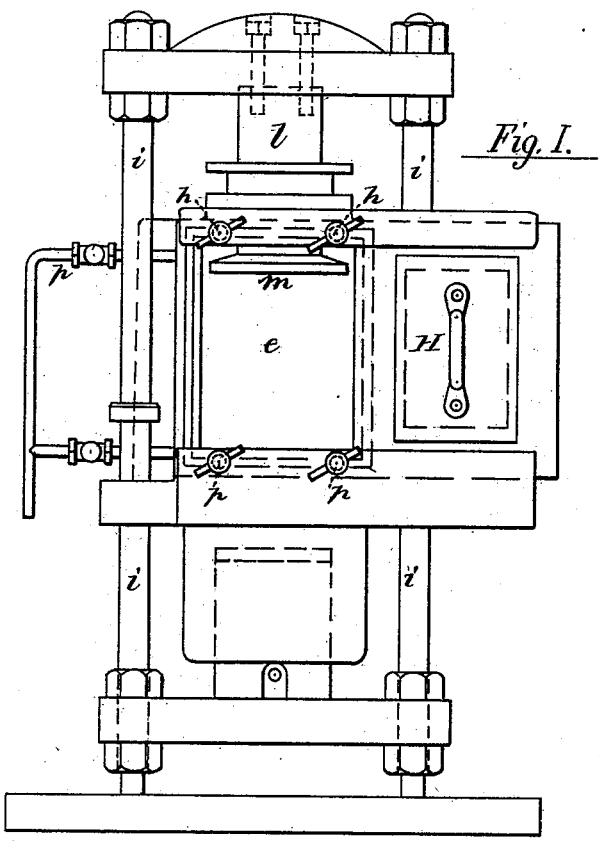
Fig. I.
Attest:
Cha? C Gill
F Walter Fowler
Inventor:
John W. Hyatt
by his attorneys Cox & Cox 4 Sheets—Sheet 2.
J. W. HYATT.
Manufacture of Combs from Celluloid, &c.
No. 199,909. Patented Feb. 5, 1878.
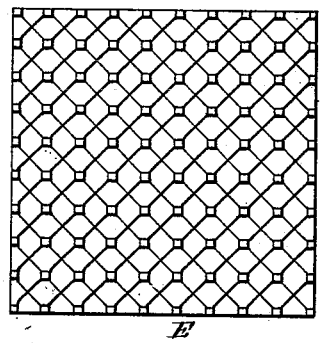
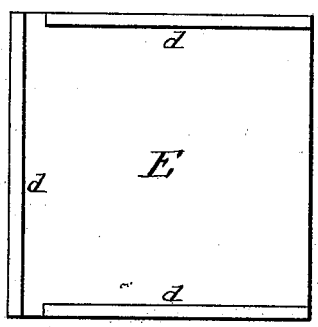
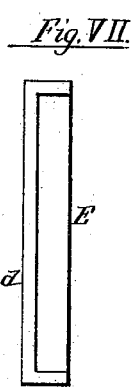
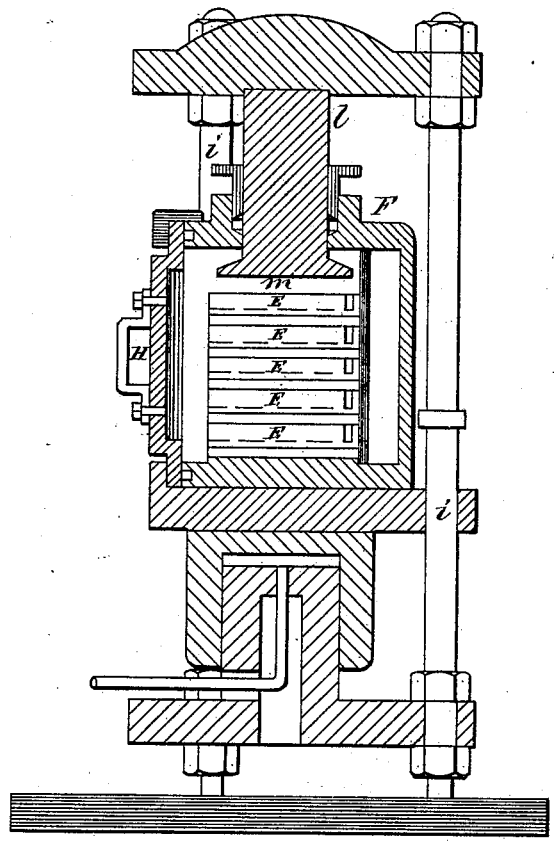
Attest:
Chas. P. Gill
J. Walter Fowler
Inventor:
John W. Hyatt
by his attorney Cox & Cox 4 Sheets—Sheet 3.
J. W. HYATT.
Manufacture of Combs from Celluloid, &c.
No. 199,909. Patented Feb. 5, 1878.
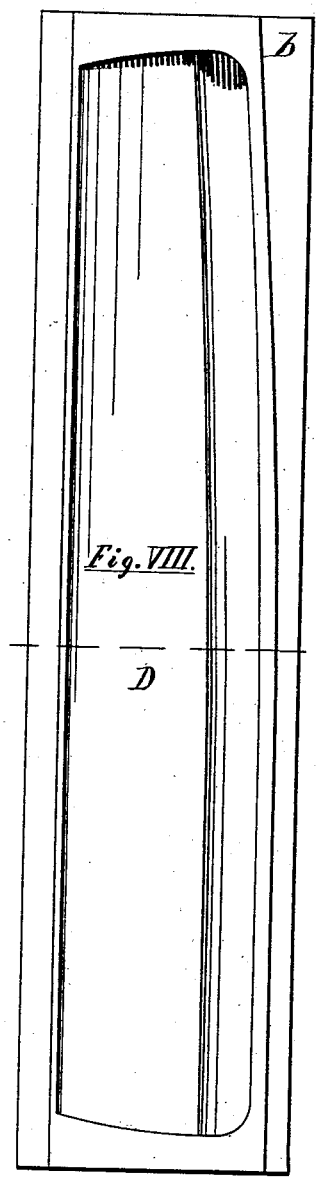
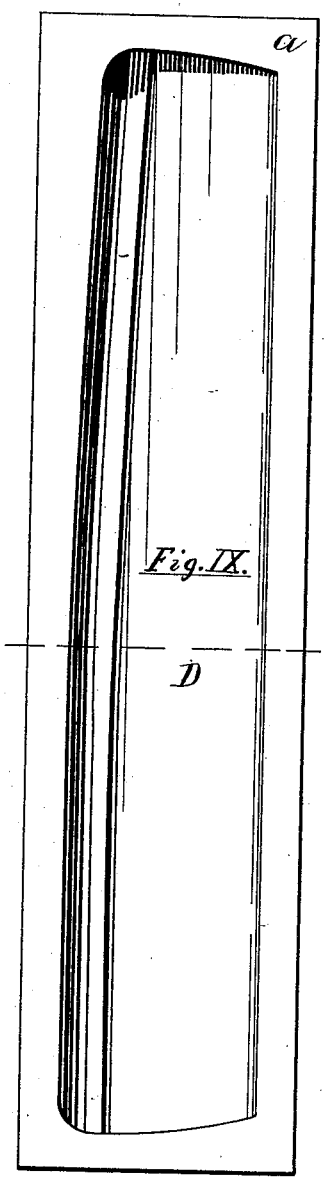
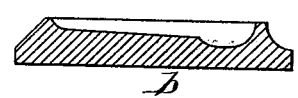
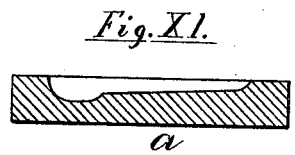
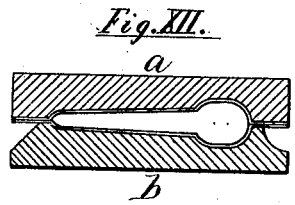
Attest:
Chas. P. Gill
J. Walter Fowler
Inventor.
John W. Hyatt.
by his attorney Cox & Cox 4 Sheets—Sheet 4.
J. W. HYATT.
Manufacture of Combs from Celluloid, &c.
No. 199,909. Patented Feb. 5, 1878.
Fig. 16.
Fig. 13.
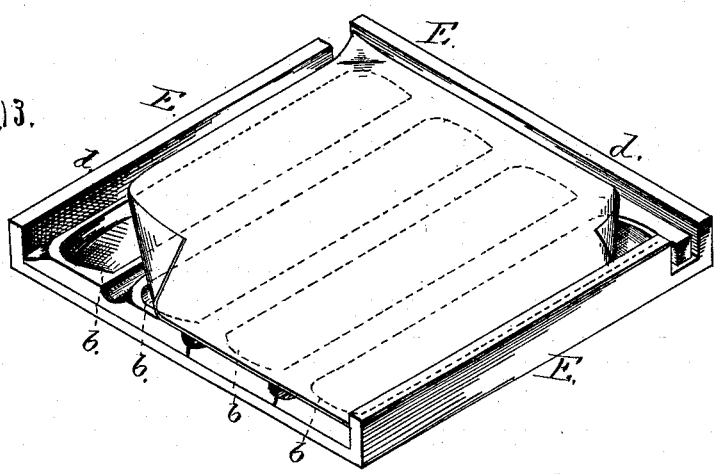
Fig. 14.
Fig. 15.
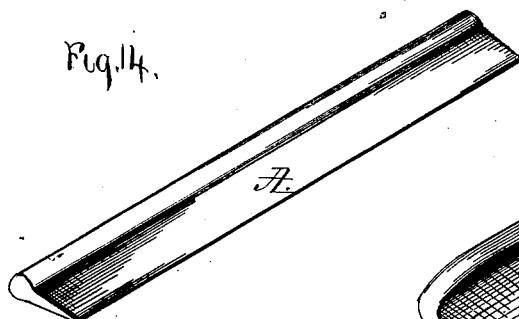
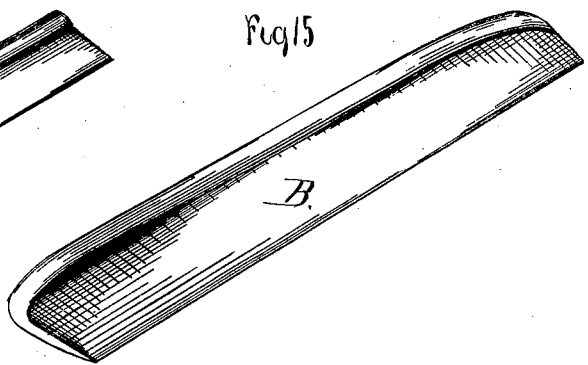
Witnesses;
F. Walter Fowler
Chas. L. Gill
Inventor;
John W. Hyatt
By his Attys,
Cox and Cox
N. PETERS, PHOTO-LITHOGRAPHER, WASHINGTON, D. C.

UNITED STATES PATENT OFFICE.

JOHN W. HYATT, OF NEWARK, NEW JERSEY, ASSIGNOR TO THE CELLULOID MANUFACTURING COMPANY, OF SAME PLACE.

IMPROVEMENT IN THE MANUFACTURE OF COMBS FROM CELLULOID, &c.

Specification forming part of Letters Patent No. 199,909, dated February 5, 1878; application filed December 26, 1877.

*To all whom it may concern:*

Be it known that I, JOHN W. HYATT, of Newark, in the county of Essex and State of New Jersey, have invented a new and useful Improvement in Processes of Manufacturing Combs of Plastic Compositions, of which the following is a specification, reference being had to the accompanying drawings.

The invention relates to an improved comb, and to the process for producing the same, as hereinafter fully described.

Heretofore, as far as known, combs have been made of wood, metal, horn, hard rubber, and an imperfect and unsuitable variety of pyroxyline. Such combs possess the defects that are incident to the material of which they are made when employed for such structures. Thus a comb made of wood, besides being liable to warp, does not possess the requisite strength for its purpose, and becomes foul or viscid when allowed to remain coated with oil or dampened by water, with either of which substances it is almost certainly brought in contact when in use. For a comb, horn is liable to similar objections, though in a less degree, but, on the other hand, is liable to sliver or fray on the edges of its teeth. Metal will oxidize or rust when brought in contact with water, while hard rubber is weak, brittle, electric, has a disagreeable odor, and does not retain its flexibility when at a low temperature. Combs heretofore made of pyroxyline have been either too brittle for use, or non-elastic, inert, and excessively pliant.

The object of this invention is to furnish a comb that possesses more valuable qualities than any heretofore constructed, and which at the same time is free from all the defects incident to combs made of the said materials.

This purpose is effected by constructing the comb of the article known as "celluloid," which, as well as the process for producing it, is fully described in the Letters Patent of the United States No. 105,338, dated July 12, 1870, and granted to John W. Hyatt and Isaiah S. Hyatt, for "improvement in treating and molding pyroxyline," said Letters Patent having been reissued, No. 5,928, on the 23d day of June, 1874; and also in the Letters Patent of the United States No. 156,352, dated October 27, 1874, granted to said parties, for "improvement in manufacturing solidified collodion;" hence no claim is herein laid or asserted to either the said material or the method of producing the same, or to the process or product, or either thereof, as set forth in said Letters Patent, or any one thereof.

The article produced by the processes described in said Letters Patent—to wit, celluloid—has been found to possess many valuable properties which admirably adapt it to the construction of many devices, especially combs. Thus celluloid is easily molded or stamped when warm, and then, being cooled, retains the contour or shape it received when warm. It is not affected by cold, but retains its elasticity and flexibility at any climatic temperature. It is much stronger and less frangible than wood, hard rubber, or horn, lighter than metal, and is not affected by oil or water, and is, moreover, capable of assuming a very high polish, and of being colored in any manner desired, or made to represent ivory, tortoise-shell, or amber, and also malachite, lapis lazuli, and various gems. The surface of the material is not harsh to the skin, while its flexibility and tenacity are such that a comb made of it can be bent into a circle without fracturing, and then straightened into proper shape, the teeth of the comb being always perfectly flexible and elastic; nor would it be fractured by bending or by falling from a great height. Obviously none of the other materials above described would produce a comb possessing the many excellent qualities and inherent superiorities of a comb made of celluloid, which thus becomes a new and distinctive article of manufacture of great value.

The process by which the device involved is produced consists in first forming a strip of the celluloid, which, in transverse section, approximates to that of the comb, which strip is severed into pieces of suitable length, one of which is coated with a suitable solution, lubricant, or other matter, to enable it to be readily separated from any porous material, and is then placed in the cavity of a metal die, which cavity is of suitable shape to form a comb-blank, and is lined with porous material; or the piece of celluloid may be enveloped in such material, the purpose of which is to permit the escape of the gas or vapor generated in the die during the process. The die and its contents are next placed in a cylinder, which is then closed and filled with hot oil or glycerine, or their equivalents, at a proper temperature, which warms the die and the material, rendering the latter plastic. Pressure is now brought to bear on the die, causing the material in it to assume the form of a comb-blank. While still under pressure, cold water is admitted into the cylinder, which cools the die and the celluloid therein, hardening the latter, which has now been formed into a comb-blank. The cylinder is now opened, the die is taken out, separated, and the blank removed. The porous lining which adheres to it is stripped off, when the blank is ready to be formed into a comb.

In the accompanying drawings, Figure 1 is a front elevation, showing the cylinder with the door open ready to receive the dies. Fig. 2 is a transverse section of the cylinder, showing the case of dies in place. Fig. 3 is a vertical elevation, partly in section, showing the cases for the dies in place. Figs. 4, 5, 6, and 7 are views, respectively, of the edge, plan of the base of the case E, and of the upper side and edge of same. Figs. 8 and 9 are plan views of the upper and lower sections of the die. Figs. 10 and 11 are transverse sections of same on the lines shown. Fig. 12 is a transverse section through center of die, with the lining in place. Fig. 13 is a perspective view of the frame E, showing the dies in place and the porous material partially covering them. Fig. 14 is a perspective of a piece of celluloid. Fig. 15 is a like view of a pressed comb-blank. Fig. 16 is a like view of the finished comb.

In the accompanying drawings, A represents a section of a strip of celluloid. B represents the comb-blank made from the strip A, while C represents the finished comb. D represents a die, consisting of an upper and lower section, $a$ and $b$, which are provided with guides, each having a cavity somewhat smaller than one-half of the blank desired, divided on the plane of its longitudinal vertical center. Thus, when the sections $a$ and $b$ are united, a cavity is formed in the die somewhat smaller than the blank sought—this to the end that the material, when acted upon by the die, shall be somewhat densified.

The dies D are all made so as to have the same exterior superficies, preferably a rectangular parallelogram, so that several of the dies can be packed and secured in the case E, wherein they may be retained by means of the lugs $d$. The bases of the dies may be corrugated or indented to afford channels for the admission of the heating or cooling agents, or the said bases may be flat and a corrugated plate interposed between the dies for the said purpose; or the lower surface of the case E may, as in the present instance, be corrugated.

The said construction touching the superficies of the dies is a preferred expedient to facilitate the formation of a number of comb-blanks at a single operation.

The die D is composed of metal or other suitable material, its cavities being lined with some porous material, parchment-paper preferred, though ordinary paper, muslin, or other porous, textile, or equivalent fabric will answer.

If the cavities in the die are deep, the stronger material should be employed, in order that the lining may not be parted by the action of the press. To this end it is advisable to moisten or otherwise render the lining flexible before it is laid in or upon the cavity.

Another method of utilizing this lining is to wrap the piece of celluloid in it and lay the enveloped piece in the die; another, to place a sheet of the lining over one cavity, depositing the piece of celluloid on the lining and superposing a second piece of lining above, the other section of the die being then placed above the lining last mentioned.

The purpose of this lining is to prevent the gas and vapor generated in the operation of pressing the material from being confined between the material and the surface of the cavity in the die, which, if thus confined, would operate as protuberances and produce indentations in the plastic material; but, owing to the porous character of the lining, the said gas and vapor enter the apertures in the lining or escape through it, thus avoiding the defect that would result to the blank were such lining not used.

Preferably, the piece B, before being placed in contact with the lining, should be coated with a thin liquid admixture of talc and tallow, or other oleaginous materal, to facilitate the removal of the lining from the celluloid after it has been pressed.

Any admixture that will serve the purpose of the above is to be deemed its equivalent in this behalf.

The mechanism for operating the dies consists of a cylinder, F, having an aperture, $e$, extending over its entire front, which aperture is packed about its edges with a strip of rubber or other suitable material, and is closed by means of a door, H, which slides in the grooves provided in the base and head of the cylinder, which overlap the edges thereof, and which, at suitable points, are provided with clamp-screws $h$, having handles, all arranged so that they may be employed to clamp the door, when closed in a steam-tight manner, over the aperture $e$. The base of the cylinder rests upon the head of an upward-acting hydraulic ram, and as it moves is guided by the rods $i$ below, and by the piston $m$ above. The head of the piston m enters the cylinder, and fills or partially fills the area of the upper part thereof.

The cylinder F is provided with an inlet, p, for the admission of the heating agent. For this purpose steam is generally employed, and will circulate properly when admitted to the cylinder; but as certain kinds of celluloid are injured by the action of the steam upon the dies containing it, oil or glycerine, or their equivalents, heated to from 200° to 280°, is preferred, which must be caused to circulate through the cylinder and about the dies. To this end it is supplied from a tank (not shown) placed above the cylinder, and drawn out into and through the cylinder by means of a pump, (not shown,) and properly connected with the cylinder, which pump may be utilized to restore the fluid to the tank. The circulation may, of course, be accomplished by many other means, and is essential, since the mere presence of the heated oil or glycerine will not suffice. The cylinder is also provided with an inlet, n, for the admission of water or other cooling agent. Both the ram and cylinder F should be furnished with suitable gages.

The operation for producing the comb-blank is as follows: The die D, containing one of the pieces of celluloid, B, and properly lined, as aforesaid, or several dies, each so filled and inclosed in the case E, are introduced into the cylinder F until it is nearly filled. The door H is then closed and clamped securely over the aperture by means of the screws h. The dies are now inclosed in a steam-tight chamber, into which hot oil, glycerine, steam, or other suitable warming liquid or fluid is now admitted and circulated until the gage indicates that such a temperature has been reached as will render the celluloid plastic. As the fluid flows over the dies and enters the same it acts upon them and their contents much more effectually than radiated or conducted heat would, or than would be the case were the dies, frames, and cylinder warmed merely. Obviously other heated liquids and fluids may be used. The hydraulic ram is now put in operation, elevating the cylinder and bringing up the dies superposed upon its base until the upper one is in contact with the head m of the piston above, and the desired pressure is exerted on each die. This pressure forms the celluloid in the die into the desired blank, the confined gas and vapor generated in the heated dies being taken up by or escaping through the porous material enveloping the celluloid, which thus prevents the formation of indentations therein.

The hydraulic pressure is continued until the gage shows a pressure equal to five (5) tons, or thereabout, on each die, at which point the pressure is maintained, the oil or glycerine being then drawn off, and the cylinder flooded with cool or cold water, or other chilling agent, which cools the dies and the material therein, the latter becoming hard at once, it having been formed meantime into a comb-blank by the pressure. The pressure is then relieved and the door H opened, the frames are withdrawn from the cylinder, the dies opened, the blanks taken out, and the paper or lining separated from them, when they are ready to be finished into combs.

What I claim as my invention, and desire to secure by Letters Patent, is—

1. As a new article of manufacture, a comb made of celluloid, substantially as specified.

2. A porous non-adhesive covering or lining for the purpose of receiving or affording an escape for gases or vapor generated from the article enveloped when warmed under pressure, substantially as specified.

3. The case E, provided with the lugs d, substantially as and for the purpose specified.

4. A metallic die having a porous surface, and exposed to a body of hot fluid or liquid heating agent, substantially as and for the purpose specified.

5. A movable cylinder provided with the head m, in combination with a metallic die lined with porous material, substantially as set forth.

6. As a means of absorbing gas and vapor, a piece of porous non-adhesive material inserted between a heated metallic or equivalent surface and an object to be pressed, substantially as specified.

7. The movable cylinder F, provided with a door, h, in combination with the head m, and piston l, and rods i, substantially as specified.

8. The die D, provided with the cavities a b, lined with a porous material, substantially as specified.

9. A strip of plastic composition coated with a mixture, substantially such as herein described, that prevents the adhesion of porous material, and enveloped in a covering of porous material, substantially as specified.

10. The process of molding plastic composition herein described, which consists in coating the composition with a substance or admixture to prevent the adhesion of porous material, then placing it in a metal or equivalent die, with porous material interposed between the die and the composition, and subjecting the die and material simultaneously to pressure and the action of a warming liquid or fluid, and then to the action of a chilling agent, substantially as specified.

11. As a new article of manufacture, the comb-blank B, substantially as specified.

12. As a means of forming plastic compositions, a die having a porous surface, a cylinder, a piston movable therein, and a hydraulic ram, substantially as specified.

13. The combination of a metallic or equivalent die lined with a porous coating, a liquid or fluid heating agent, and pressure, substantially as specified.

14. A die lined with porous material, and subjected to successive operations of heating and cooling without change of pressure, substantially as set forth.

15. A current of hot oil, glycerine, or their equivalent, for the purpose of heating a piece of celluloid, substantially as set forth.

In testimony that I claim the foregoing improvement in process of manufacturing combs of plastic composition, as above described, I have hereunto set my hand this 19th day of November, 1877.

JOHN W. HYATT.

Witnesses:
 SAML. S. TIFFANY,
 H. L. JOHNSTON.